US008635170B2

(12) United States Patent
Drory et al.

(10) Patent No.: US 8,635,170 B2
(45) Date of Patent: *Jan. 21, 2014

(54) ADAPTIVE BUSINESS PROCESS AUTOMATION

(71) Applicant: International Business Machines Corporation, Armonk, NY (US)

(72) Inventors: Tal Drory, Haifa (IL); Amir Geva, Yokneam (IL); Eugene Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/737,958

(22) Filed: Jan. 10, 2013

(65) Prior Publication Data
US 2013/0124450 A1  May 16, 2013

Related U.S. Application Data

(63) Continuation of application No. 12/769,668, filed on Apr. 29, 2010, now Pat. No. 8,396,815.

(51) Int. Cl.
G06G 7/00 (2006.01)
G06N 7/02 (2006.01)

(52) U.S. Cl.
USPC ............................................. 706/11; 706/52

(58) Field of Classification Search
None
See application file for complete search history.

(56) References Cited

U.S. PATENT DOCUMENTS

| 5,877,759 | A | 3/1999 | Bauer |
| 6,842,877 | B2 | 1/2005 | Robarts et al. |
| 7,565,340 | B2 * | 7/2009 | Herlocker et al. ............... 706/52 |
| 2004/0255270 | A1 | 12/2004 | McGlinchey et al. |
| 2006/0184410 | A1 | 8/2006 | Ramamurthy et al. |
| 2007/0050719 | A1 | 3/2007 | Lui et al. |
| 2008/0001959 | A1 | 1/2008 | Geva et al. |
| 2008/0183744 | A1 | 7/2008 | Adendorff et al. |

OTHER PUBLICATIONS

Srivastava, B., "AutoSeek: A Method to Identify Candidate Automation Steps in IT Change Management", Integrated Network Management, 2007. IM apos;07. 10th IFIP/IEEE International Symposium on, Volume , Issue , May 21, 2007-Yearly 25 2007 pp. 864-867.
12Ghosts Inc., "12Ghosts Robo", 2009.
José A. Macias and Pablo Castells, "Finding Iteration Patterns in Dynamic Web Page Authoring", 2005.

* cited by examiner

Primary Examiner — Jeffrey A. Gaffin
Assistant Examiner — Mikayla Chubb

(57) ABSTRACT

A method, system and computer software product are provided for process automation. The method includes monitoring one or more workstations to obtain multiple sets of character and graphical information including user actions, times and durations associated with the user actions, user-entered data, and retrieved character and graphical screen data. The method further includes identifying functional events from the sets, defining focal states as respective historic patterns of the functional events, and generating a set of facilitating scripts associated with respective ones of the focal states. The facilitating scripts each provide one or more automatic actions in the workstations. At least a portion of the set of facilitating scripts are then executed.

12 Claims, 6 Drawing Sheets

ADAPTIVE BUSINESS PROCESS AUTOMATION

CROSS-REFERENCE TO RELATED APPLICATIONS

This Application is a continuation of application Ser. No. 12/769,668, filed 29 Apr. 2010.

BACKGROUND

This invention relates to the field of process automation. In particular, the invention relates to adaptive business process automation.

Business processes are often defined as a flow sequence of operations on a single or set of systems or applications. This flow is composed of interactions with screens of the system in which the operator needs to verify fields of information for a valid content, take note of certain fields for later processing, enter new information or update existing fields, and navigate between screens.

Some business processes involve systems or applications that were not designed with optimization of operator work in mind Some business processes involve a combination of systems which were not designed to interact and work together. Therefore, these processes are often cumbersome, involve many operations on possibly different screens in possibly different systems, and hence error prone.

The result of these issues is that often an operator needs to invest a considerable amount of time and effort in order to complete the business process. This time and effort has a substantial cost for the organization, which can be significantly reduced.

There are existing systems that assist operators and users in these processes. For example, there are tools that help users fill online forms using pre-populated information of the user (e.g., name, address, phone number), as well as more elaborate systems that can automatically extract such information from the user's actions (e.g., password managers) and resources, such as email correspondence.

BRIEF SUMMARY

There is provided according to embodiments of the invention a method for process automation, which is carried out by monitoring one or more workstations to obtain multiple sets of character and graphical information from the workstations that include user actions, times and durations associated with the user actions, user-entered data, retrieved character screen data and graphical screen data. The method is further carried out by identifying functional events from an automatic analysis of the sets, wherein the functional events comprise at least the durations associated with the user actions, automatically defining focal states as respective historic patterns of the functional events, and generating a set of facilitating scripts associated with respective ones of the focal states. The facilitating scripts each provide one or more automatic actions in the workstations. The method is thereafter carried out by executing at least a portion of the set of facilitating scripts. The steps of the method are implemented in either computer hardware configured to perform the steps, or computer software embodied in a non-transitory, tangible, computer-readable storage medium.

Another aspect of the method includes matching a pattern of the functional events to one of the focal states, and applying the one or more automatic actions of a selected member of the set of facilitating scripts associated with the one focal state.

According to one aspect of the invention, matching a pattern of the functional events includes fuzzy matching.

Yet another aspect of the method executing includes obtaining a measurement of a predetermined cost function, and perturbing the executed facilitating scripts to generate adapted facilitating scripts, and iterating the execution using respective adapted facilitating scripts as the facilitating scripts to obtain new measurements of the cost function. The adapted facilitating scripts are optimized by penalizing ones of the adapted facilitating scripts having new measurements that increase the cost function and encouraging others of the adapted facilitating scripts having new measurements that reduce the cost function with respect to previous instances of the adapted facilitating scripts.

There are further provided according to other embodiments of the invention a computer software product and a data processing system for carrying out the method.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

Figure 1:
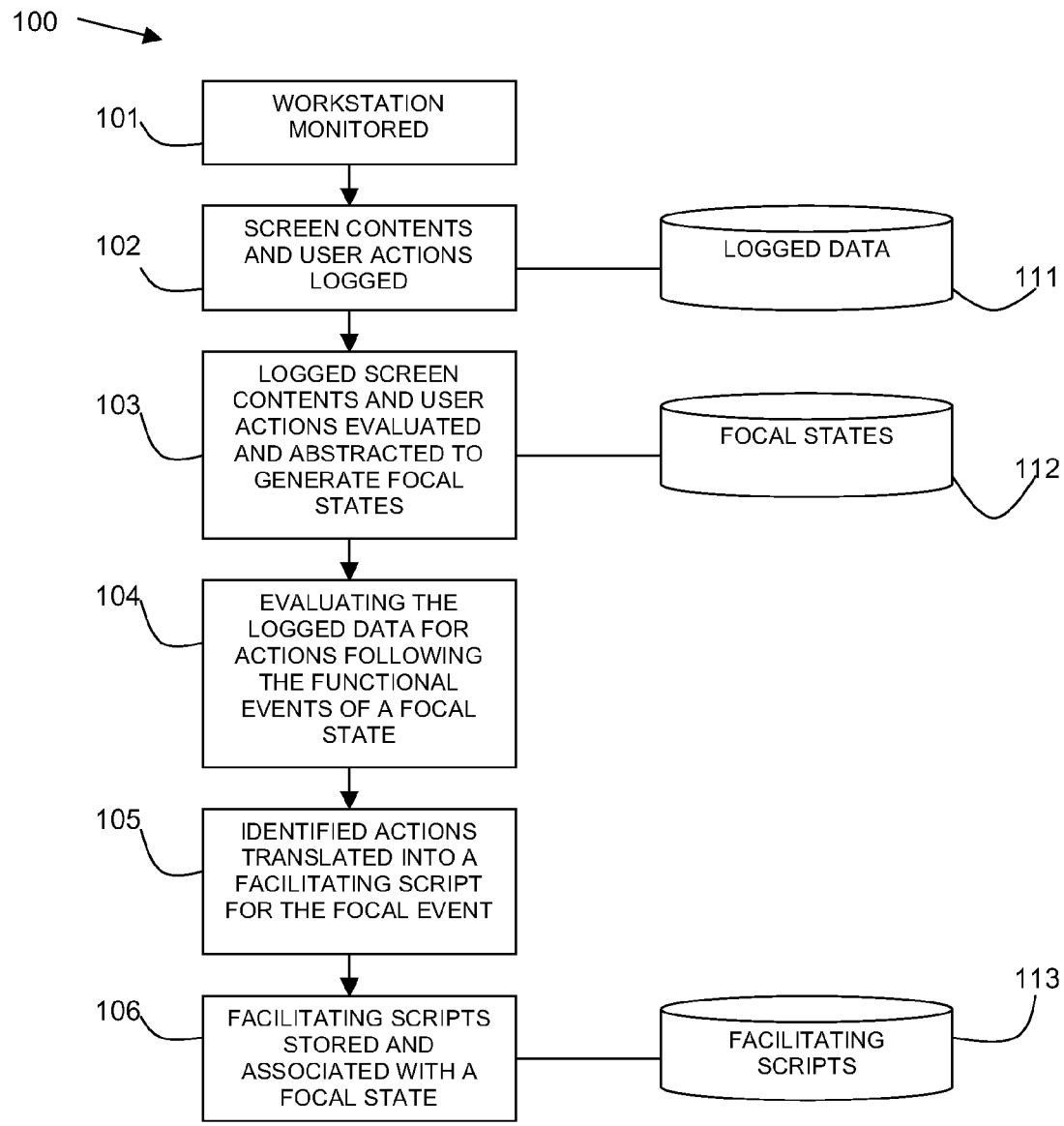
FIG. 1 is a flow diagram of a method in accordance with an aspect of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A method, system and computer program product are described in which operator actions are monitored and the information used in order to have automatic or semi-automatic identification of interesting states in transaction processes. Special scripts are activated in order to facilitate fast and correct transaction conclusion. The impact of such special scripts is monitored so that, in future transactions, most effective scripts would be applied.

The manual work of the operator is monitored by a monitoring system and information about screens contents and actions the operator performs on these screens is stored. The monitoring is of actions and events from the view of the human operator. The monitoring may include: the entered and retrieved data; the screen contents; the movements of the user around the screen (for example, mouse movements); switching between viewed windows, files, applications, or systems; and logs of the timing of each operation. This stored set, dynamically updated, is referred to as the "current set".

Information in the current set may be kept on a functional level. For example, operator A viewed customer B's address for 5 seconds, operator A viewed last year's service request for a further 10 seconds, and it took operator A 20 seconds to reach the approval decision.

In addition, the described system calls for identification of a set of "focal states" in the transaction processing. A focal state may also be defined on a functional level, including a sequence of functional events. Such focal states can be predefined by the system administrator (for example, a state where an operator reviewed required information and was unable to reach resolution for at least 10 seconds). Alternatively, states can be identified by automatic analysis of historic patterns.

Each focal state has an associated single or set of "facilitating scripts". Again, such scripts can be either predefined by the system administrator or prepared automatically based on the analysis of historic logs. Facilitating scripts provide one or more automatic actions such as keyboard or mouse actions or function calls.

A user's workstation system will start its operation in the conventional manner. However, in parallel to the conventional operation, the current set would be constantly analyzed in order to identify focal states of interest (either by exact match, or fuzzy match where only some of the functional events in the current set match the functional events in the focal state, for example using Regular Expression type of fuzzy matching).

Once a focal state is identified, the automation system will step in, with or without the operator notification and approval, and the related facilitating script will be executed. When the system concludes, the control is transferred again to the operator. Alternatively, the operator will be shown a pop up window with set of possible facilitating scripts to be chosen from manually.

The aim of the facilitating scripts is to facilitate transaction completion (for example, by automating fetching of the necessary information or automatic report preparation). This would manifest itself by improvement of certain performance measures (for example, elapsed time to the transaction completion or probability of the return to the given transaction due to the customer appeal). The system would monitor such performance measurements and prioritize the scripts accordingly.

In one embodiment, "focal states" in the form of sequences of functional events to be identified in the operation of a user's workstation may be defined by an administrator. One or more "facilitating scripts" associated with a focal state may also be defined by an administrator. A facilitating script is a script of actions to be automatically carried out by a system to aid the human operator, starting when the system reaches an identified focal state to which the facilitating action is associated.

In an alternative embodiment, the focal states and facilitating scripts may be generated automatically. Referring to FIG. 1, a flow diagram 100 shows one embodiment of a method of generating automation data sets. A workstation is monitored 101 and information relating to the screen contents and user actions is logged 102 as logged data 111.

The logged data 111 is analysed by evaluating and abstracting to generate 103 "focal states" 112 in the form of sequences of functional events. For example, this may be done by looking for repeated sequences of similar events or repeated data patterns.

One or more facilitating scripts 113 are identified for a focal state 112. A facilitating script 113 is a script of one or more actions to be automatically carried out by a system. For example, facilitating scripts 113 may be automatically generated by analysing and evaluating 104 the logged data for actions following a focal state of functional events. The identified actions can then be translated 105 into a facilitating script for the focal event in the form of a script to be automatically applied. The facilitating script is then stored and associated 106 with the focal state.

Each facilitating script is associated to a focal state in a way that when activated in a future scenario from that focal state it would "bring" the system to a "next" desired state.

Figure 2:
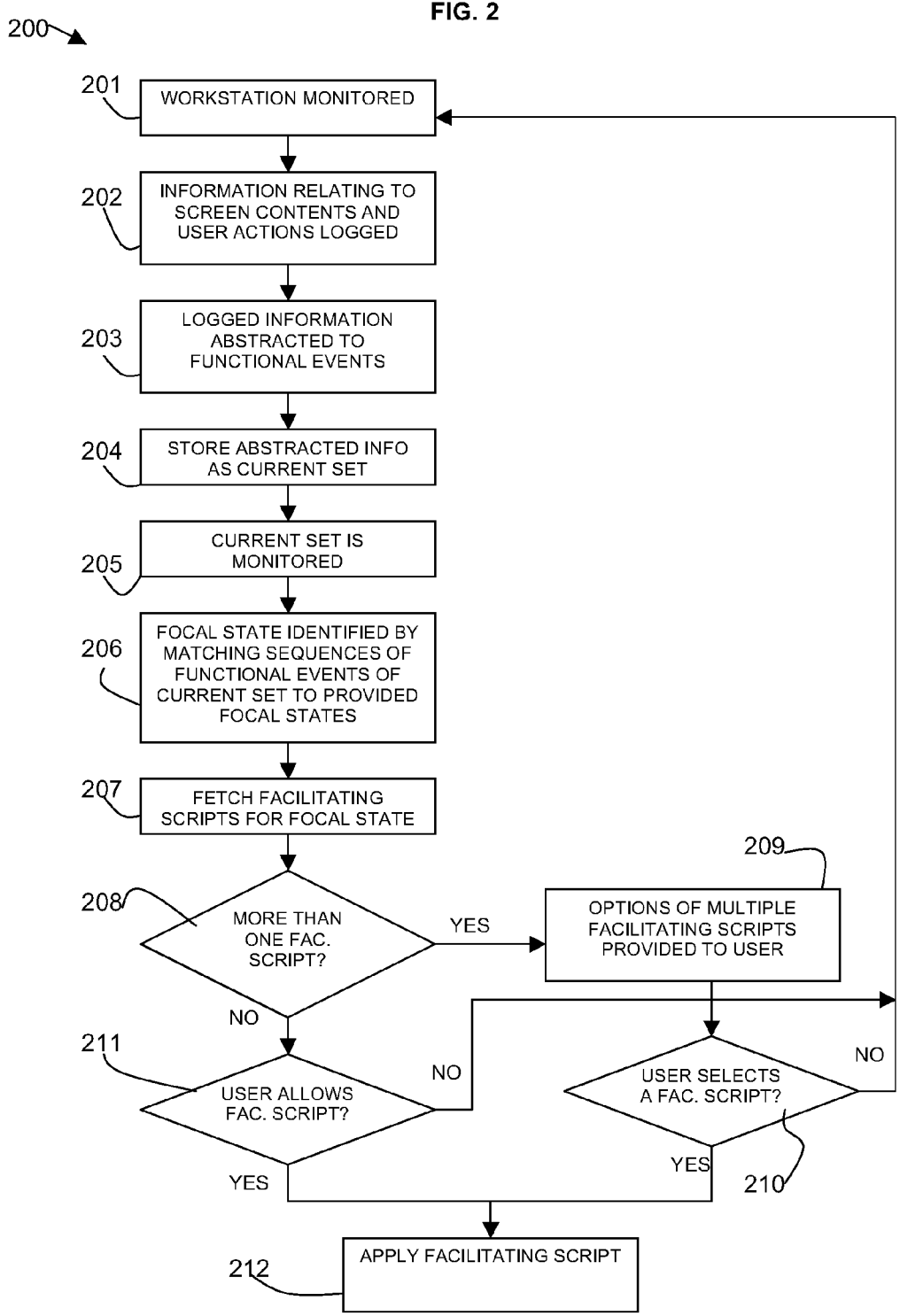
FIG. 2 is a flow diagram of a method in accordance with an aspect of the present invention.

Referring to FIG. 2, a flow diagram 200 shows the method of using the stored data sets for process automation. A workstation is monitored 201 and information relating to the screen contents and user actions is logged 202 and analysed to abstract 203 to functional events. The functional events are stored 204 as the "current set" of user operations.

The current set is monitored 205 and a focal state identified 206 by matching a sequence of functional events of the current set to the sequence of functional events in a focal state.

Facilitating scripts associated with the identified focal state are fetched 207. It is determined 208 if there are more than one facilitating scripts associated with the identified focal state. If so, the options of multiple facilitating scripts are provided 209 to the user.

The user selects 210 a facilitating script or, optionally, has the choice to ignore the facilitating scripts. If the facilitating scripts are ignored, the method continues to monitor 201 the workstation.

If there is only one facilitating script, optionally, the user is notified of the facilitating script with an option 211 to allow the automation or to ignore it. If the facilitating script option is ignored, the method continues to monitor 201 the workstation.

If a facilitating script is accepted, it is applied 212 to the user activity to automatically carry out the actions of the facilitating script. The method continues to monitor 201 the workstation.

Figure 3:
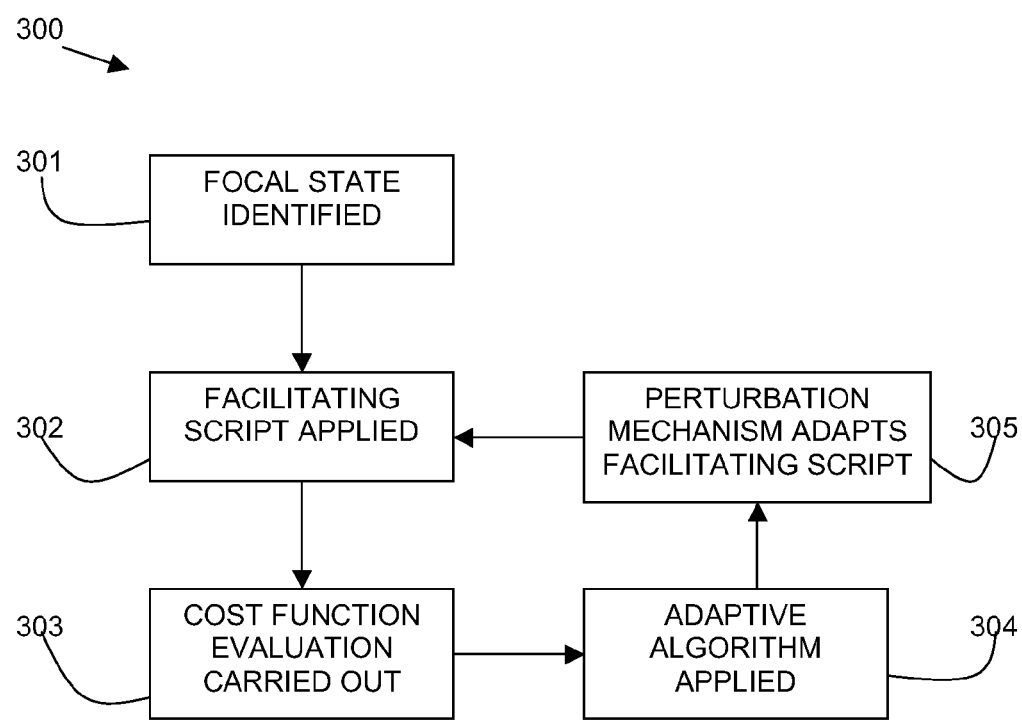
FIG. 3 is a flow diagram of a method in accordance with an aspect of the present invention.

Referring to FIG. 3, a flow diagram 300 shows an additional optional aspect in which the impact or cost of the actions of a facilities script is monitored and the facilitating script is dynamically adapted to optimize the effect of the actions.

A focal state is identified 301 and a facilitating script is applied 302 by the same process as described in FIG. 2. A facilitating script is applied 302 with an initial implementation state. A cost function evaluation 303 is carried out to measure one or more parameters of the system to determine the effectiveness of the facilitating script. An adaptive algorithm 304 is applied which determines if the result of the cost function evaluation 303 should be encouraged or penalised. A perturbation mechanism adapts 305 the facilitating script to provide an adapted facilitating script. The adapted facilitating script is applied 302 and the process repeated. After many iterations of adapting the facilitating script, the system will converge to an optimized solution.

An example of the facilitating script adaptation aspect is described. The focal state may be the detection of the arrival of a transaction of type A (this may include different descriptors such as request type, source (customer group), date etc.), which should then be assigned by the system to an operator from a pool of operators. A facilitating script may be a routing script that routes that transaction to an operator. The routing script can be implemented by having random assignment of transactions to each operator with the possibility of biasing (so that, for example, operator O1 will have 90% of chance of getting transaction of type A).

An initial implementation of the facilitating script may be that of uniform distribution of transactions to each operator (i.e. no biasing or all the biases equal to each other). The adaptive perturbation mechanism will change the facilitating script (for example, by sending a given type of transaction to randomly chosen operator O1).

For each perturbation, the system will measure a predetermined cost function (for example, the execution time with predetermined penalty for errors, or an instantaneous cost for the given transaction minus an average cost for all operators, instantaneous cost can be estimated as a transaction execution time increased by, say, 10 times error rate).

Perturbations that reduce cost function would be encouraged. Perturbations that increase the cost function would be penalized. For instance, if routing to O1 reduced the cost function, the system would be biased to send more transactions of this type to O1. For each transaction, the change in bias may be small. However, after many transactions, the system will converge. In such a manner the system would move towards the optimal solution.

Figure 4:
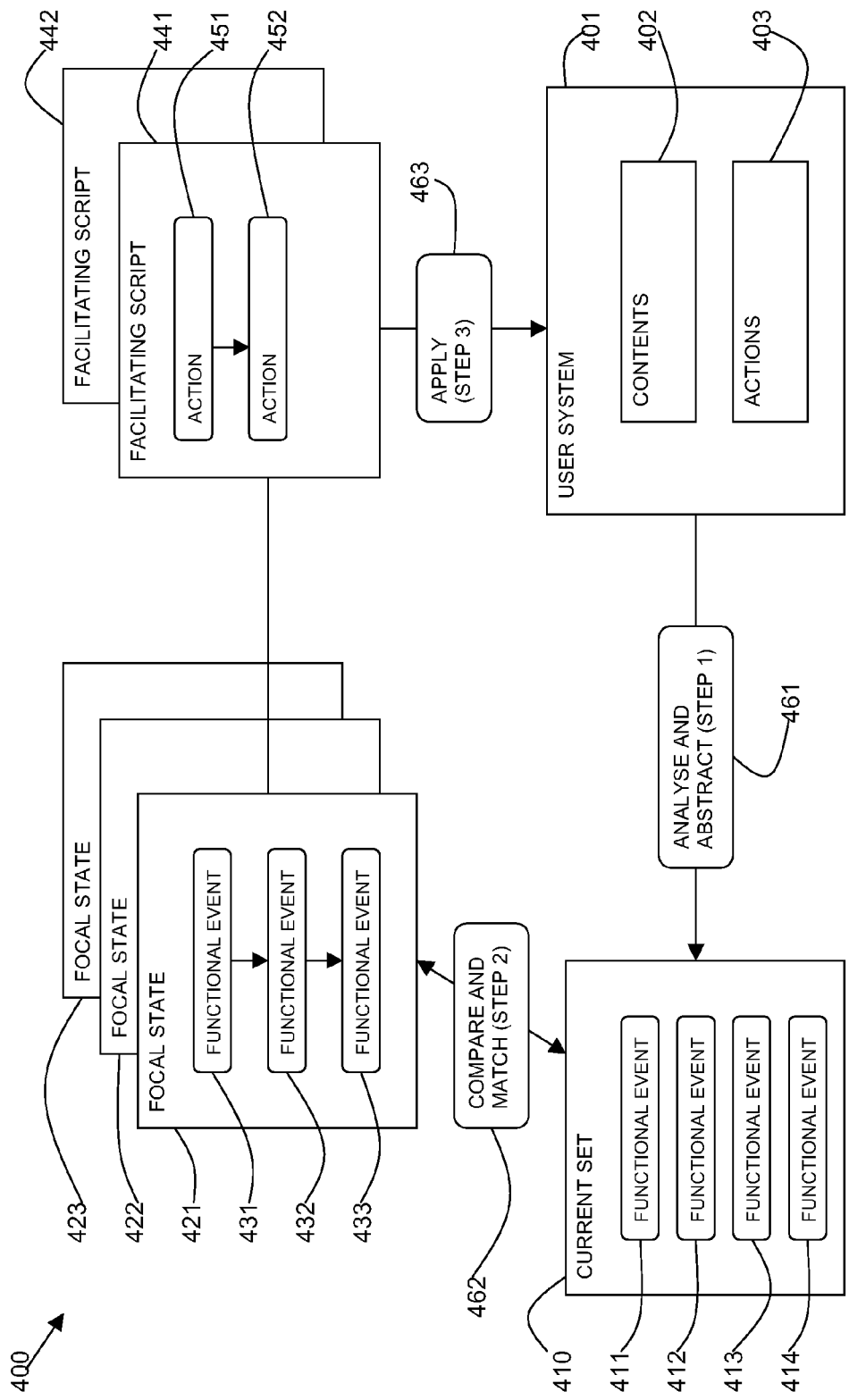
FIG. 4 is a schematic diagram of a process in accordance with the present invention.

Referring to FIG. 4, a schematic diagram shows the process of monitoring a user interface of a user system or workstation to provide automation.

A user system or workstation 401 includes screen contents 402 and user inputs or actions 403. At a first step, a current set 410 is dynamically recorded of functional events 411-414. The current set 410 is obtained from the user system 401 by analysis and abstraction 461 of the contents 402 and actions 403 of the user system 401 to define functional events 411-414.

A set of focal states 421-423 is provided, with each focal state 421-423 defining a sequence of functional events 431-433. One or more facilitating scripts 441-442 are provided for each focal state 421-423. Facilitating scripts 441-442 provide one or more actions 451-452 to be automatically carried out when a focal state 421-423 is identified in the user system 401.

At a second step, the focal states 421-423 are compared and matched 462 to the functional events 411-414 in the current set 410 by exact or fuzzy matching of the functional events 411-414 of the current set 410 to functional events 431-433 of focal states 421-423.

If a match is found, in a third step a facilitating script 441-442 associated with the matched focal state 421-423 is applied 463 to the user system 401. A user may have the option to choose if a facilitating script is applied or which one of multiple facilitating scripts is applied.

The adaptive facilitating script aspect would be applied in the apply step 463 of FIG. 4 with iterations of adaptations of the facilitating script applied with cost analysis of each adaptation.

Figure 5:
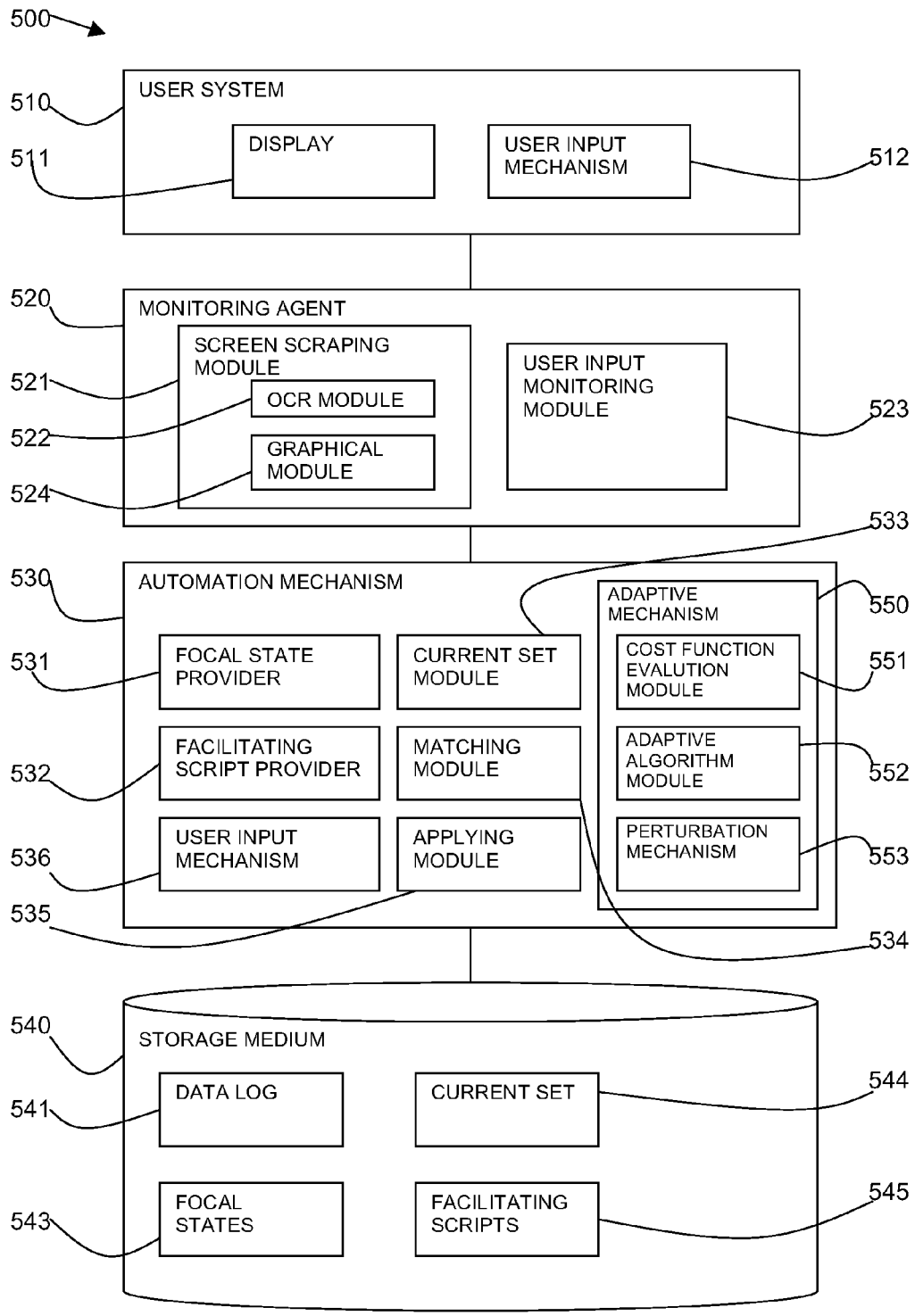
FIG. 5 is a block diagram of a system in accordance with the present invention.

Referring to FIG. 5, a block diagram shows a system 500 in which a user system or workstation 510 includes a display 511 such as a screen or other mechanism for showing contents and a user input mechanism 512 controlling inputs or actions such as keyboard inputs, pointer device inputs, touch screen inputs, pointer device movements, etc.

The user system 510 is monitored by a monitoring agent 520 to gather information regarding events, actions, and data. The monitoring may include all (or parts) of the information known either to the user or to the system. User information can be determined, for instance, by screen scraping and extracting all the information that has been seen by the user. System information can be determined, for example, by logging performance history for all the users.

The monitoring agent 520 includes a screen contents monitor in the form of a screen scraping module 521 for obtaining character information and graphical information. The monitoring agent 520 includes an optical character recognition (OCR) module 522 for obtaining information and data regarding the contents of the display 511 of the user system 510 as viewed by a human operator. This includes the content of different windows within a display. The monitoring agent 520 also includes a graphical module 524 for obtaining graphical information such as icons in the system and other graphical elements (such as lines, boxes, etc.) and analysis of the hierarchical structure of the screen.

Screen scraping techniques include capturing the bitmap data of the screen and running it through an OCR engine, or in the case of GUI applications, querying the graphical controls by programmatically obtaining references to their underlying programming objects, both OCR and graphical information objects. A web scraper for obtaining web content may also be included.

The monitoring agent 520 also includes a user action or input monitoring module 523 for monitoring the human operator's input including both keyboard input and other input device operations and movement, including information regarding the navigation of the user around the display 511.

A log 541 in a storage medium 540 records the monitored information and data including times and durations of actions and inputs.

A process automation mechanism 530 is provided for applying automation to processes carried out on the user system 510.

The automation mechanism 530 includes a focal state provider 531 for providing focal states 543 in the form of sequences of functional events. The focal state provider 531 may allow an administrator to define the focal states 543 or, alternatively, may include an automatic focal state generator for analysing the data log 541 and generating focal states.

The automation mechanism 530 also includes a facilitating script provider 532 for providing facilitating scripts 545 in the form of sequences of actions associated with a focal state. The facilitating script provider 532 may allow an administrator to define the actions in the script or, alternatively, may include an automatic facilitating script generator for analysing the data log 541 and determining actions required in a facilitating script for a focal state.

The automation mechanism 530 includes a dynamically updated current set module 533. The current set module 533 receives update data on the user system activity from the monitoring agent 520 and abstracts the data to provide a current set 544 of functional events stored in a storage medium 540.

In an example, the current set module 533 uses screen understanding and every screen viewed by the user is analyzed and information content extracted to provide the current set. A typical record would say, for example, that:

User X, viewed screen Y, containing fields of Customer Name, Customer Address, Number of the past enquiries etc.

Optionally, the system may also store information contained in each field.

The screen was viewed for n seconds.

Optionally, start and end time stamps may be kept.

Optionally, it may be useful to correlate all the keystrokes and mouse movements and actions pertaining to the given screen.

The automation mechanism 530 also includes a matching module 534 for comparing and matching stored focal states 543 to functional events in the current set 544. An applying module 535 applies a facilitating script 544 to the user system 510 for a matched focal state. The automation mechanism 530 may optionally include a user interface 536 to confirm or select a facilitating script 545 before it is applied.

An adaptive mechanism 550 may optionally be included in the automation mechanism 530 to provide adaptation of facilitating scripts 545 to optimize the applied actions. The adaptive mechanism 550 includes a cost function evaluation module 551 for evaluating the cost to the system of applying a facilitating script. The adaptive mechanism 550 also includes an adaptive algorithm module 552 for determining if the result of the cost function evaluation should be encouraged or penalised. A perturbation mechanism 553 changes the facilitating script 545 in accordance with the cost to the system.

The applying module 535 applies adapted facilitating scripts on an iterative basis until an optimized facilitating script for a system is obtained.

Figure 6:
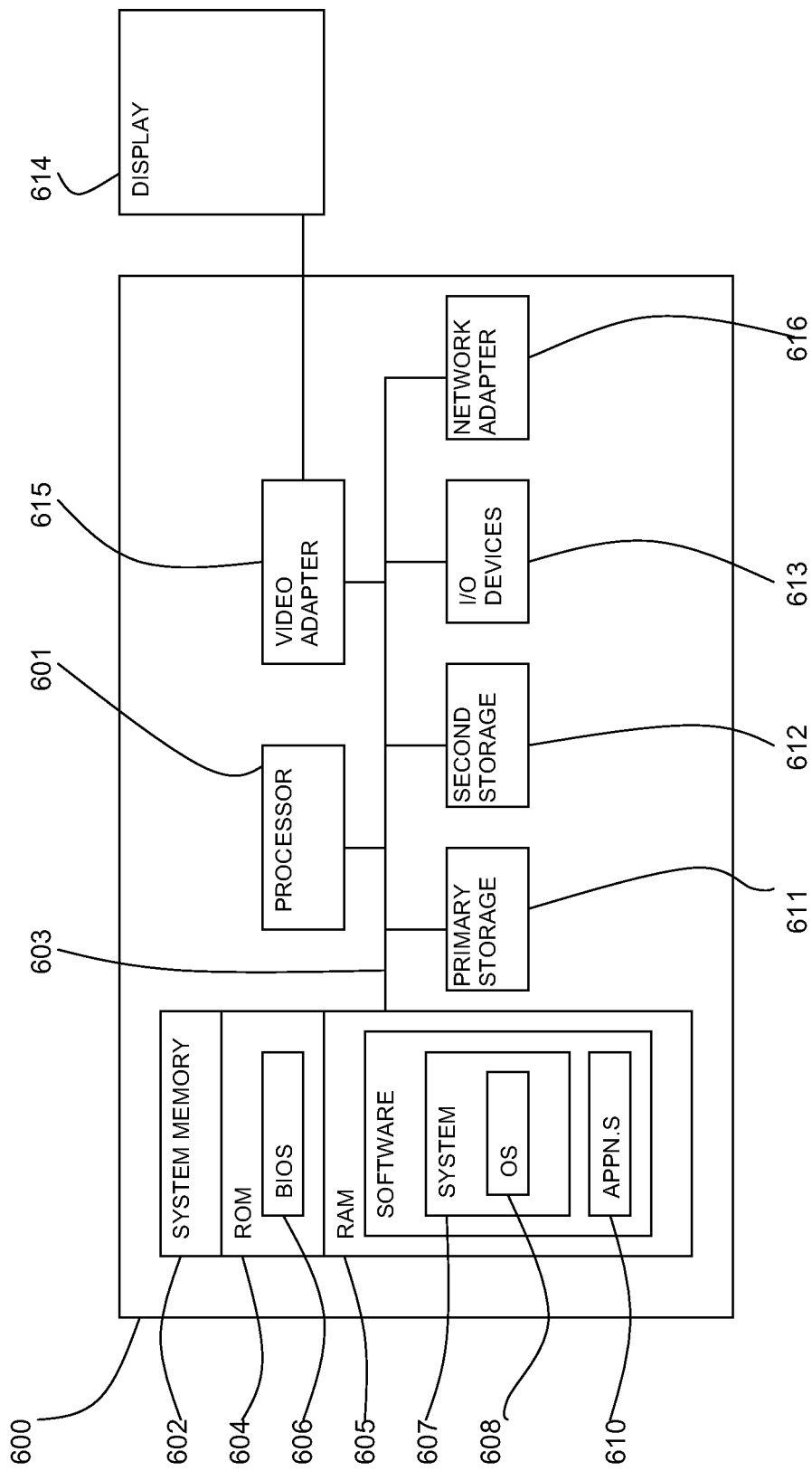
FIG. 6 is a block diagram of a computer system in which the present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements can include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. System software 607 may be stored in RAM 605 including operating system software 608. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 can be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

An example of the described process automation can be the selection of an email signature based on the destination. It is supposed that a user often wants to change his signature when sending an email to person X. A facilitating script is written and provided that replaces the signature in the email with the required signature. A set of screens/data/actions are defined as a focal set related to the facilitating script, so that whenever the screen of composing a new email appears and a certain name of recipient of person X is written into the to field, the system will automatically run the related facilitating script and the signature will be replaced.

Customization parameters can be defined for each such facilitating script. Such parameters may include for example, whether to run it automatically or after an approval of the user to a pop-up question, and specific times (for example, only weekends or only evenings) that a facilitating script is active, etc.

As an example of the automated learning of relations, suppose the operator works on a business process involving a web application and a mainframe system. The operator starts with the web application in which they get a customer's details and then they need to go into the mainframe system and perform some action for the customer (in this example, change the address of the customer.). A way to improve this manual business process is to have the system automatically learn the relations between the current set and the active screen.

When a relation appears between information seen in one screen and information that is entered in a later screen, this relation is stored in a long term memory. After a few iterations going through the same screens, if the relation is repeated a predetermined number of times, the software will use this relation to suggest to the operator to automatically fill in the fields associated with this relation. The number of times an action is repeated to constitute a reason to suggest that action in the future, may be customized by a user. Also, it may be defined that there is no contradicting behaviour which should be considered.

In another example, a business process requires the operator to key in the ID number from a web application into the mainframe screen. This retrieves the customer's details and allows the operator to key in an updated address. The monitoring agent monitors this process and identifies that the value keyed in to the ID number field in the mainframe actually appeared in the 'ID Number' field in the other application just a moment ago. If this pattern is observed to be repeated several times, the monitoring agent can suggest to the operator the next time this occurs that this information can be automatically filled in.

Another example would be the case where intranet password verification is required. This can be a time consuming process where both intranet userid and password are to be filled taking up about 20 seconds of the user time. In principle, this problem can be resolved by preparing appropriate facilitating script that would identify the verification screen and fill in the necessary information. However, this would mean that the operator would have to know and install such a feature. Using an adaptive approach, this would not be necessary. The system would identify automatically the correlation between password verification request and appropriate information being filled. After several cases, user verification would be done automatically. Now, assume that, for some reason, the password request screen is redesigned so that data verification would be filled in a different manner. In such a case the operator would have to correct the data that has been filled in automatically. Efficiency of the process would go down. As a result the system would look for (and find) new script to be used under the new circumstances.

An active option may be provided where a system would introduce minute changes and measure the results of such changes in order to determine an optimal approach.

For example, a large number of operators may perform various types of transactions. It is assumed, for the sake of simplicity, that each operator can perform each task. Commonly, in such cases all the jobs would be distributed evenly between all the operators. However, it may be that one operator is faster doing transactions of type A while another is better doing transactions of type B. In the adaptive system, system control would make small changes in the routing policy. For instance, it may try routing more jobs of type B to the first operator and more jobs of type A to the second. As a result there would be some small penalty on the system performance and as a result the system would (correctly) reverse the policy ending up with each operator doing transactions, where he/she has the best performance. In fact, in order to facilitate measurement process, some transactions may be routed to several operators.

The described automation may be used for performance measurement or optimization of complex business processes having multiple operators, potentially performing complementary tasks. Optimization is done centrally analyzing a complex multi-operator system. For example, optimization may target improvement in the transaction quality, which may not be visible on at a single workstation level; hence the optimization focuses on the impact of the given process on the final quality as measured at a later stage in the transaction processing.

For example the system may determine that, for the given focal point, facilitating script used by the operator O1 yields lower error than facilitating scripts used by operator O2 and O3 Hence, facilitating scripts for operators O2 and O3 will be amended. Alternatively, the system may determine that, even for given facilitating script, different operators feature different error rate. Hence, for instance, transactions performed by operator O1 can be accepted as is. For operators O2 and O3, the same transaction must be routed to both of them with differences being resolved by the operator O4.

In the above description, the focus is on the business process applications. However, a similar approach can be applied to personal computing. In other words, an adaptive process automation mechanism may work on a personal workstation.

An adaptive business process automation may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for process automation, comprising the steps of:
   monitoring one or more workstations to obtain multiple sets of character and graphical information from the workstations that include user actions, times and durations associated with the user actions, user-entered data, retrieved character screen data and graphical screen data;
   identifying functional events from an automatic analysis of the sets, wherein the functional events comprise at least the durations associated with the user actions;
   automatically defining focal states as respective historic patterns of the functional events;
   generating a set of facilitating scripts associated with respective ones of the focal states, wherein the facilitating scripts each provide one or more automatic actions in the workstations; and
   thereafter executing at least a portion of the set of facilitating scripts,
   wherein said steps are implemented in either:
   computer hardware configured to perform said steps, or computer software embodied in a non-transitory, tangible, computer-readable storage medium.

2. The method according to claim 1, wherein executing comprises:
   matching a pattern of the functional events to one of the focal states; and
   applying the one or more automatic actions of a selected member of the set of facilitating scripts associated with the one focal state.

3. The method as claimed in claim 2, wherein matching a pattern of the functional events includes fuzzy matching.

4. The method according to claim 1, wherein executing comprises obtaining a measurement of a predetermined cost function, the method further comprising the steps of:
   after performing the step of executing, perturbing the executed facilitating scripts to generate adapted facilitating scripts;
   iterating the step of executing using respective adapted facilitating scripts as the facilitating scripts to obtain new measurements of the cost function; and
   respectively optimizing the adapted facilitating scripts by penalizing ones of the adapted facilitating scripts having new measurements that increase the cost function and encouraging others of the adapted facilitating scripts having new measurements that reduce the cost function with respect to previous instances of the adapted facilitating scripts.

5. A computer software product for process automation, including a non-transitory computer-readable storage medium in which computer program instructions are stored, which instructions, when executed by a computer, cause the computer to perform the steps of:
   monitoring one or more workstations to obtain multiple sets of character and graphical information from the workstations that include user actions, times and durations associated with the user actions, user-entered data, retrieved character screen data and graphical screen data;
   identifying functional events from an automatic analysis of the sets, wherein the functional events comprise at least the durations associated with the user actions;
   automatically defining focal states as respective historic patterns of the functional events;
   generating a set of facilitating scripts associated with respective ones of the focal states, wherein the facilitating scripts each provide one or more automatic actions in the workstations; and
   thereafter executing at least a portion of the set of facilitating scripts.

6. The computer software product according to claim 5, wherein executing comprises:
   matching a pattern of the functional events to one of the focal states; and
   applying the one or more automatic actions of a selected member of the set of facilitating scripts associated with the one focal state.

7. The computer software product as claimed in claim 6, wherein matching a pattern of the functional events includes fuzzy matching.

8. The computer software product according to claim 5, wherein executing comprises obtaining a measurement of a predetermined cost function, the method further comprising the steps of:

after performing the step of executing perturbing the executed facilitating scripts to generate adapted facilitating scripts;

iterating the step of executing using respective adapted facilitating scripts as the facilitating scripts to obtain new measurements of the cost function; and respectively optimizing the adapted facilitating scripts by penalizing ones of the adapted facilitating scripts having new measurements that increase the cost function and encouraging others of the adapted facilitating scripts having new measurements that reduce the cost function with respect to previous instances of the adapted facilitating scripts.

9. A data processing system for process automation, comprising:

a processor;

a memory accessible to the processor storing programs and data objects therein, the programs including a monitoring agent, an automation mechanism and an adaptive mechanism, wherein execution of the programs cause the processor to perform the steps of:

invoking the monitoring agent for monitoring one or more workstations to obtain multiple sets of character and graphical information from the workstations that include user actions, times and durations associated with the user actions, user-entered data, retrieved character screen data and graphical screen data; and invoking the automation mechanism to perform the steps of: identifying functional events from an automatic analysis of the sets, wherein the functional events comprise at least the durations associated with the user actions, automatically defining focal states as respective historic patterns of the functional events, and generating a set of facilitating scripts associated with respective ones of the focal states, wherein the facilitating scripts each provide one or more automatic actions in the workstations, wherein the processor is operative for thereafter executing at least a portion of the set of facilitating scripts.

10. The data processing system according to claim 9, wherein executing comprises:

matching a pattern of the functional events to one of the focal states; and applying the one or more automatic actions of a selected member of the set of facilitating scripts associated with the one focal state.

11. The data processing system as claimed in claim 10, wherein matching a pattern of the functional events includes fuzzy matching.

12. The data processing system according to claim 9, wherein executing comprises invoking the adaptive mechanism to perform the steps of:

obtaining a measurement of a predetermined cost function;

perturbing the executed facilitating scripts to generate adapted facilitating scripts;

iterating the step of executing using respective adapted facilitating scripts as the facilitating scripts to obtain new measurements of the cost function; and respectively optimizing the adapted facilitating scripts by penalizing ones of the adapted facilitating scripts having new measurements that increase the cost function and encouraging others of the adapted facilitating scripts having new measurements that reduce the cost function with respect to previous instances of the adapted facilitating scripts.

\* \* \* \* \*